(12) United States Patent
Fucarino et al.

(10) Patent No.: US 9,162,694 B1
(45) Date of Patent: Oct. 20, 2015

(54) CLEAN STREET CAN SYSTEM

(71) Applicants: Michael Fucarino, Ridgefield Park, NJ (US); Nancy Dembski, Ridgefield Park, NJ (US)

(72) Inventors: Michael Fucarino, Ridgefield Park, NJ (US); Nancy Dembski, Ridgefield Park, NJ (US)

(*) Notice: Subject to any disclaimer, the term of this patent is extended or adjusted under 35 U.S.C. 154(b) by 0 days.

(21) Appl. No.: 14/017,325

(22) Filed: Sep. 4, 2013

Related U.S. Application Data

(60) Provisional application No. 61/696,507, filed on Sep. 4, 2012.

(51) Int. Cl.
  *B62B 1/14* (2006.01)
  *B62B 1/16* (2006.01)
  *B62B 1/26* (2006.01)

(52) U.S. Cl.
  CPC ..................... *B62B 1/264* (2013.01)

(58) Field of Classification Search
  CPC ........................................ B62B 1/264
  USPC .......... 280/47.24, 47.26, 47.27, 47.131, 79.5, 280/79.6; 248/98, 128, 129
  See application file for complete search history.

(56) References Cited

U.S. PATENT DOCUMENTS

| | | | | |
|---|---|---|---|---|
| 2,634,933 A | * | 4/1953 | Grimsley | 248/129 |
| 2,667,320 A | * | 1/1954 | Whitley | 248/147 |
| 2,802,673 A | * | 8/1957 | Hazlett | 280/47.24 |
| 3,845,968 A | | 11/1974 | Larson et al. | |
| 3,907,117 A | * | 9/1975 | Williams | 211/85.19 |
| 5,887,834 A | | 3/1999 | Gellos et al. | |
| 2003/0020261 A1 | * | 1/2003 | Perelli et al. | 280/651 |
| 2004/0245735 A1 | * | 12/2004 | Pins | 280/79.5 |
| 2007/0175900 A1 | | 8/2007 | Richardson | |

* cited by examiner

*Primary Examiner* — John Walters
(74) *Attorney, Agent, or Firm* — RG Patent Consulting, LLC; Rachel Gilboy

(57) ABSTRACT

An apparatus to provide a specially designed assembly system for garbage and recycling containers having an effective means for joining trash receptacles to a wheeled carrier via a securement means so that they are not easily turned over by gusts of wind or animals. This device also provides a tethering mechanism between a container and a wheeled carrier so they remain joined if tipped during especially high gusts of wind or very aggressive animals.

19 Claims, 5 Drawing Sheets

CLEAN STREET CAN SYSTEM

CROSS-REFERENCE TO RELATED APPLICATION

The present application is related to and claims priority from prior provisional application Ser. No. 61/696,507, filed Sep. 4, 2012 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of containers and more specifically relates to a clean street can system to provide a specially designed assembly for outside garbage and recycling containers.

2. Description of the Related Art

Humans produce much garbage and recyclable materials during consumption. The vast majority of buildings, both residential and commercial use containers to store such materials. As useful and necessary as outside garbage and recycling receptacles are, their use presents a drawback; even when these containers are loaded down with trash and other items, they can easily be knocked over. All it takes is a particularly strong gust of wind to send the containers spiraling down the street with its contents springing free from their confines to litter the landscape. Not only can this be annoying and frustrating to chase down the container and subsequently pick up the mess, but errant containers can also present a safety hazard for oncoming traffic. If a car is forced to swerve out of the way of the container, an accident may result. Outside receptacles are not only susceptible to wind, but large stray animals searching for a quick meal can easily tip over these containers, leaving behind a mess for homeowners. It is desirable that such containers be stable, with a low center of gravity, yet user-friendly.

Various attempts have been made to solve the above-mentioned problems such as those found in U.S. Pub. No. 3,845,968 to Mary E. Larson et al, U.S. Pat. No. 5,887,834 to Todd A. Gellos et al, and U.S. Pub. No. 2007/0175900 to Todd Richardson. This art is representative of refuge containers. None of the above inventions and patents, taken either singly or in combination, is seen to describe the invention as claimed.

Ideally, a clean street can system should provide an effective means for securing trash receptacles to a wheeled carrier so that they are not easily turned over by gusts of wind or animals and, yet would operate reliably and be manufactured at a modest expense. Thus, a need exists for a reliable clean street can system to avoid the above-mentioned problems.

BRIEF SUMMARY OF THE INVENTION

In view of the foregoing disadvantages inherent in the known container art, the present invention provides a novel clean street can system. The general purpose of the present invention, which will be described subsequently in greater detail is to provide a specially designed assembly for outside garbage and recycling containers having an effective means for securing trash receptacles to a wheeled carrier so that they are not easily turned over by gusts of wind or animals.

The clean street can system will be appreciated by individuals wanting to avoid the mess that occurs when a filled trash or garbage container is tipped over resulting in the contents being spilled. When the wheeled-carrier and the container are secured to each other with a retractable-cord and a securement means, a functional structure is developed to resist gusts of wind and the efforts of animals seeking to tip over the container to access the contents. The idea of the present system is to automatically return a lightweight plastic garbage receptacle to a weighted base. The spring-loaded mechanism (return system) has enough torque to return the receptacle to an upright self-attached position using the proper self-attachers (hook and loop or magnetic or both). The receptacle may have a concave base to ride over curbs or the base may be convex in alternate embodiments. The wheeled-carrier preferably comprises a concaved base.

A clean street can system is disclosed herein, in a preferred embodiment, comprising a trash-can-assembly having in combination a wheeled-carrier, a container, and a retractable-cord. The wheeled-carrier comprises in combination a base having a first-attacher, at least one pair of wheels, and a u-shape-handle. The container comprises in combination a container-bottom having a second-attacher, a side-wall having a top-receiving-opening, a lid having a lid-attacher, a cylindrical shape inner volume for holding at least one disposable item defined by the container-bottom, the side-wall and the lid, a plurality of generally-round-ventilation-holes, and a pair of handles are located in/on the side-wall. The retractable-cord comprises a cord-first-end and a cord-second-end. The retractable-cord may comprise any suitably durable material.

The wheeled-carrier is of sufficient strength and size to hold the container when filled with at least one disposable item comprising non-recyclable garbage. The base comprises a concave-platform for holding the container-bottom. The first-attacher of the base is sized to match a size of the container-bottom having the second-attacher. When the container is placed on the base of the wheeled-carrier the first-attacher and the second-attached are joined to promote stability in use. The base further preferably comprises a ramp with an inclined surface such that the container can be maneuvered onto the base of the wheeled-carrier with relative ease. The base also comprises a short-retaining-wall measuring about four to eight inches in height having a left-wall, a back-wall and a right-wall for retaining the container-bottom.

At least one pair of wheels is removably attached to the base via an axle running through the back-wall such that the trash-can-assembly is readily mobile. The pair of wheels may comprise molded rubber with tread useful in indoor and outdoor environments and for negotiating a variety of terrains.

The u-shape-handle comprises a handle-first-end, a handle-second-end, a handle-cross-section and a handle-height in preferred embodiments. The handle-first-end and handle-second-end are removably inserted into the back-wall via a left-back-wall-opening and a right-back-wall-opening. The handle-cross-section may comprise a rubber-cover such that the user is able to have a firm (and comfortable) grip on the handle-cross-section when maneuvering the wheeled-carrier. The u-shape-handle further comprises at least one generally horizontal retaining-section with a curvature for retaining the side-wall of the container for stability in use.

The container is attachable to the base using the first-attacher and the second-attacher. The first-attacher and the second-attacher preferably comprise hook-and-loop such that when the container is placed onto the base the container is removably attached to the base via the hook-and-loop fastener. The container comprises a cylindrical shape inner volume extending upwardly from the base and is defined by the container-bottom and the side-wall having a top-receiving-opening. The container extends upwardly from the base to the top-receiving-opening of the container, the height able to be filled with refuse.

The plurality of generally-round-ventilation-holes on the container side-wall is useful for ventilating the container when in use. The pair of handles are formed in the side-wall of the container adjacent a top of the side-wall and are useful for lifting and placing the container onto and off of the base. The lid is removably attachable to the container via a lid-attacher comprising a wire loop such that the inner volume is able to be substantially enclosed when the lid is attached and alternately accessed when the lid is removed.

The retractable-cord having the cord-first-end and the cord-second-end comprises a tether able to be retracted into a retractable-cord-holder of the container-bottom. The cord-first-end of the retractable-cord is attached to the base of the wheeled-carrier, and the cord-second-end of the retractable-cord is attached to the side-wall of the container adjacent a bottom of the side-wall such that the wheeled-carrier and the container remain coupled if the trash-can-assembly is knocked over. This prevents the present invention from becoming detached and causing danger or mess.

When in-use, a user is able to attach the container to the base via the retractable-cord and place at least one disposable item into the cylindrical shape inner volume of the container, and transport the trash-can-assembly between locations for collection and disposal of the disposable item using the wheeled-carrier.

A kit is included for the clean street can system including at least one wheeled-carrier, at least one container, at least one first-attacher, at least one second-attacher, at least one lid, at least one lid-attacher, at least one retractable-cord and at least one set of user instructions. A method of use for the clean street can system is also disclosed herein.

The present invention holds significant improvements and serves as a clean street can system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, clean street can system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a refuse container and more particularly to a clean street can system as used to improve the ability to tether a trash container to a wheeled-carrier such that it is less susceptible to being tipped over by gusts of wind or by animals seeking food. Thus, the present invention serves to promote cleanliness and public safety.

Generally speaking, accumulating garbage and recyclable trash in containers is a way of life in any home. Many families have a scheduled day of the week when their garbage and recyclable trash will be picked up and hauled away. So, on a regular schedule, these families place their containers outside and often do so the night before the scheduled pickup. These families want to feel assured that during the night their containers will not be knocked over by gusts of wind or animals seeking food. The clean street can system disclosed herein provides an assembly of a wheeled-carrier and a container that when joined together is able to withstand these gusts of wind or intrusion by animals and remain in a standing position.

Figure 1:
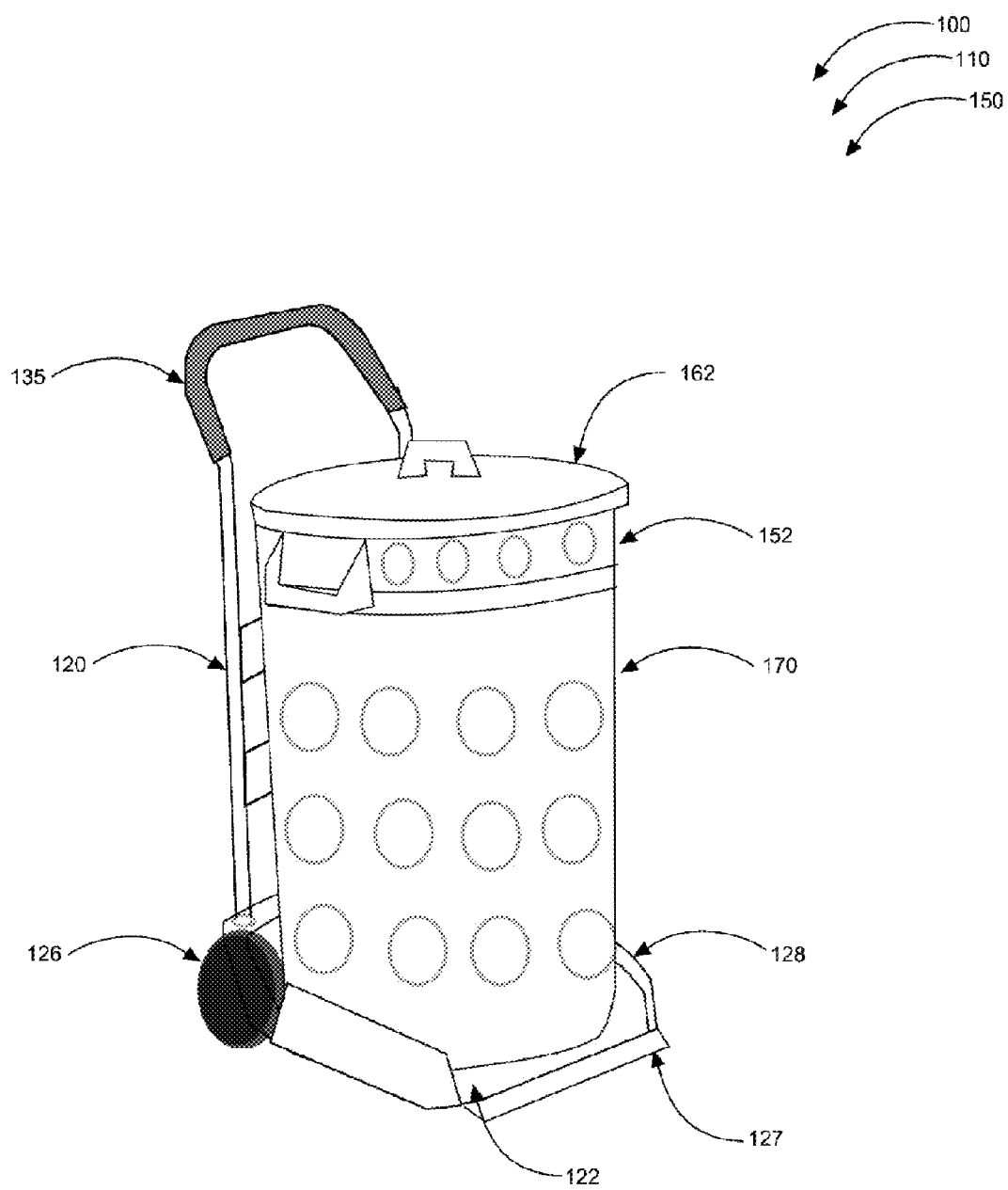
FIG. 1 shows a perspective view illustrating a trash-can-assembly in a ready for use condition according to an embodiment of the present invention.

Referring to the drawings by numerals of reference there is shown in FIG. 1, a perspective view illustrating clean street can system 100 in a ready for use condition 150 according to an embodiment of the present invention.

Clean street can system 100 preferably comprises trash-can-assembly 110 having in combination wheeled-carrier 120, container 152, and retractable-cord 180. Wheeled-carrier 120 comprises in combination base 122 having first-attacher 124, at least one pair of wheels 126, and u-shape-handle 135. Container 152 comprises in combination container-bottom 154 having second-attacher 156, side-wall 170 having top-receiving-opening 160, lid 162 having lid-attacher 164, cylindrical shape inner volume 166 for holding at least one disposable item defined by container-bottom 154, side-wall 170 and lid 162. Container 152 further comprises a plurality of generally-round-ventilation-holes 174, and pair of handles 176. Retractable-cord 180 comprises cord-first-end 182 and cord-second-end 184. Retractable-cord 180 comprises tethering means.

When in-use, a user is able to attach container 152 to base 122 via retractable-cord 180 and place at least one disposable item (of sufficient size) into cylindrical shape inner volume 166 of container 152, and transport trash-can-assembly 110 between locations for collection and disposal of the disposable item using wheeled-carrier 120. The present invention is readily portable.

Figure 2:
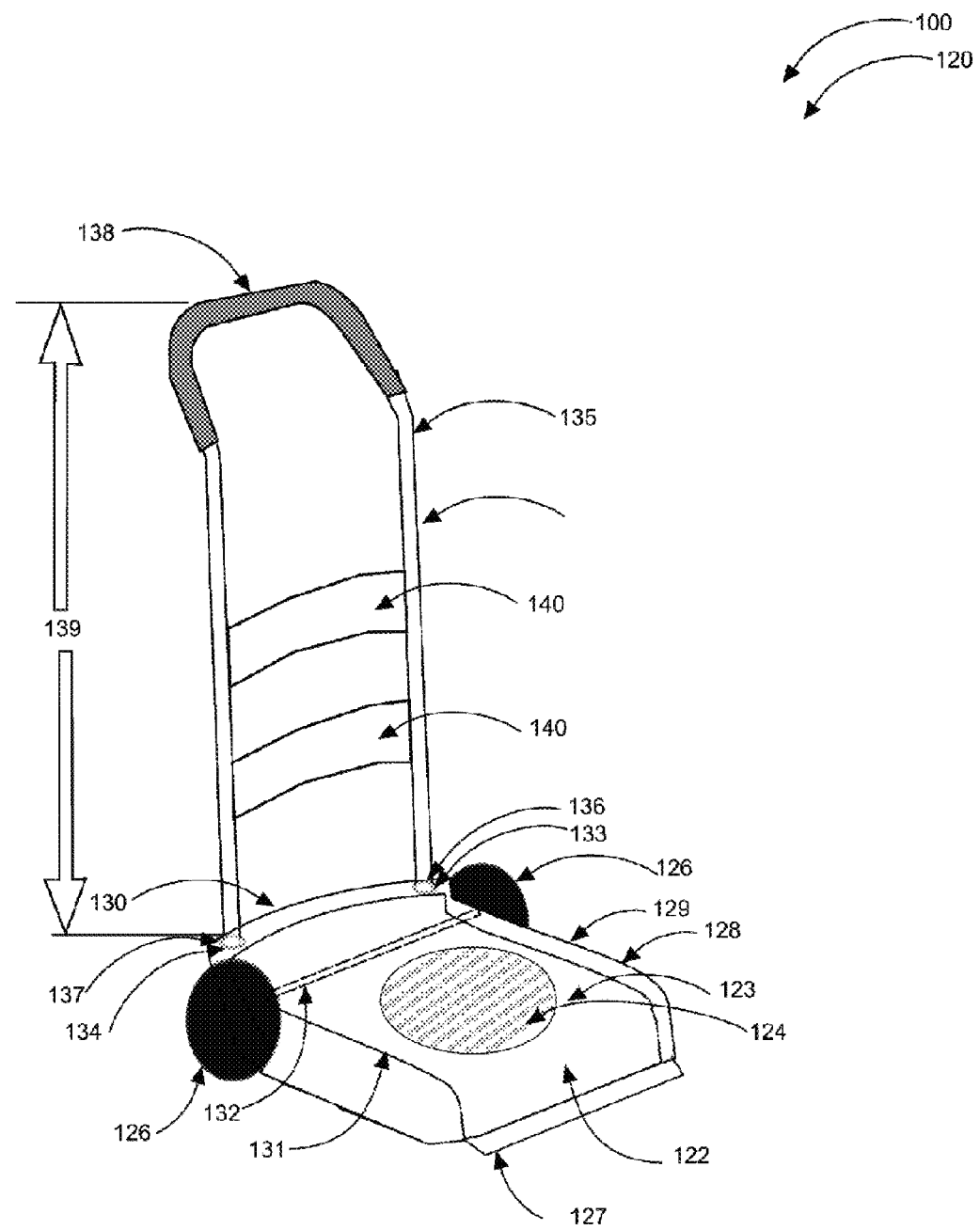
FIG. 2 is a perspective view illustrating a wheeled-carrier according to an embodiment of the present invention of FIG. 1.

Referring now to FIG. 2, a perspective view illustrating wheeled-carrier 120 according to an embodiment of the present invention of FIG. 1.

Wheeled-carrier 120 is of sufficient strength and size to hold container 152 when filled with at least one disposable item comprising non-recyclable garbage. Container 152 may also be used for containing recyclable trash or other such items. Base 122 comprises concave-platform 123 for holding container-bottom 154. First-attacher 124 of base 122 is sized to match a size of container-bottom 154 having second-attacher 156. When container 152 is placed on base 122 of wheeled-carrier 120 first-attacher 124 and second-attacher 156 are joined to promote stability. Base 122 further comprises ramp 127 with an inclined surface such that container 152 can be maneuvered onto base 122 of wheeled-carrier 120. Base 122 also comprises short-retaining-wall 128 preferably measuring about four to eight inches in height having left-wall 129, back-wall 130 and right-wall 131 for retaining container-bottom 154.

At least one pair of wheels 126 is removably attached to base 122 via axle 132 running through back-wall 130 such that trash-can-assembly 110 is readily mobile. At least one pair of wheels 126 comprises molded rubber with tread useful in indoor and outdoor environments and for negotiating a variety of terrains. In an alternate embodiment at least one pair of wheels 126 comprises molded plastic with tread.

U-shape-handle 135 comprises handle-first-end 136, handle-second-end 137, handle-cross-section 138 and handle-height 139. Handle-first-end 136 and handle-second-end 137 are removably inserted into back-wall 130 via left-back-wall-opening 133 and right-back-wall-opening 134. Handle-cross-section 138 comprises a rubber-cover such that the user is able to have a firm grip on handle-cross-section 138 when maneuvering wheeled-carrier 120. U-shape-handle 135 further comprises at least one generally horizontal retaining-section 140 with a curvature for retaining the side-wall 170 of the container 152.

Figure 3:
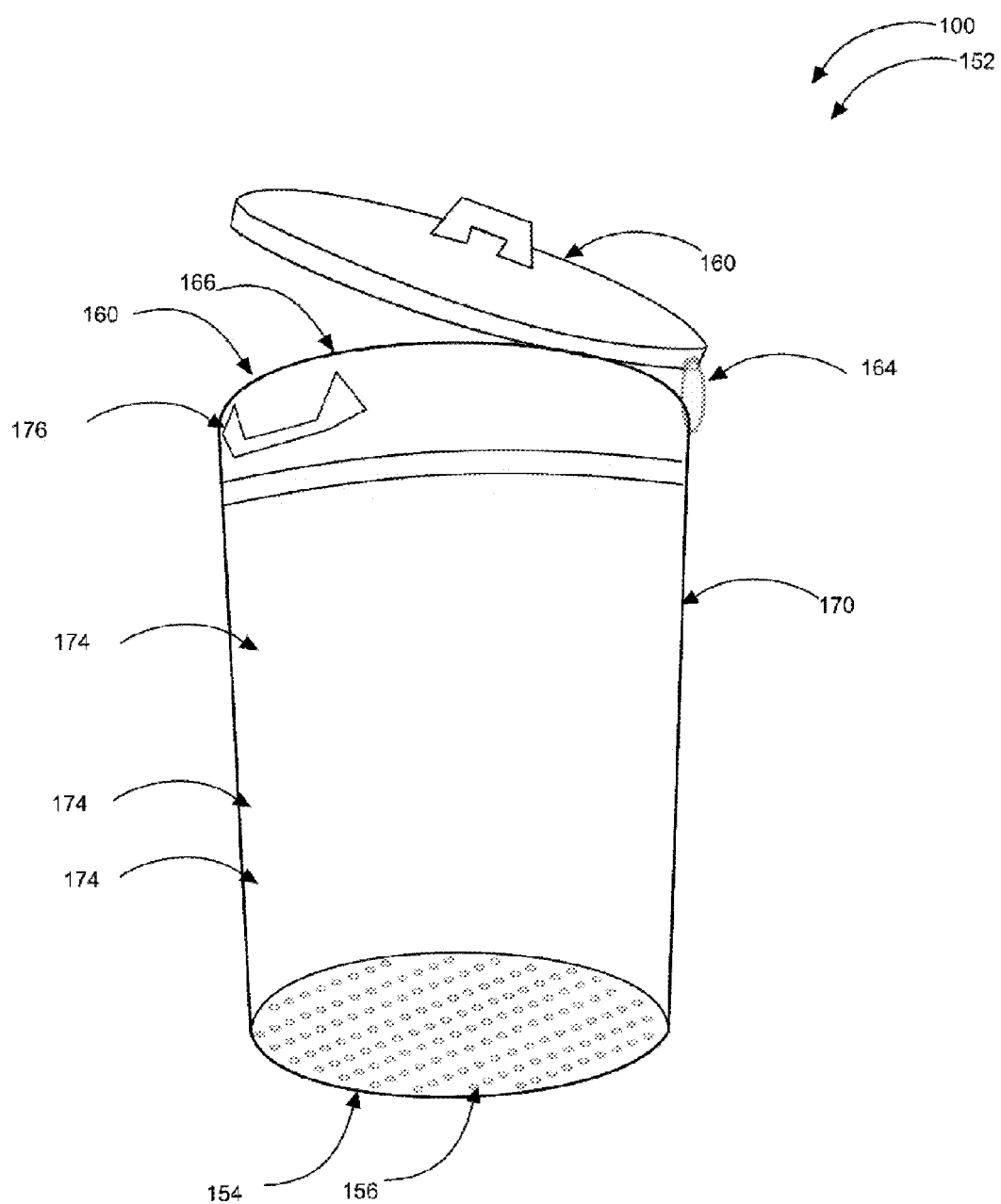
FIG. 3 is a perspective view illustrating a container and lid according to an embodiment of the present invention of FIG. 1.

Referring now to FIG. 3, a perspective view illustrating container 152 according to an embodiment of the present invention of FIG. 1.

Container 152 is attachable to base 122 using first-attacher 124 on base 122 and second-attacher 156 on container-bottom 154. First-attacher 124 and second-attacher 156 preferably comprise hook-and-loop (other fastening means may be used) such that when container 152 is placed onto base 122 container 152 is removably attached to base 122 via hook-and-loop (such as Velcro®). In an alternate embodiment first-attacher 124 and second-attacher 156 comprise a magnet such that when container 152 is placed onto base 122 container 152 is removably attached to base 122 via magnetic force. Container 152 comprises cylindrical shape inner volume 166 extending upwardly from base 122 and is defined by container-bottom 168 and side-wall 170 having top-receiving-opening 160. Container 152 extends upwardly from base 122 to top-receiving-opening 160 of container 152. Container 152 preferably comprises a 32 gallon volume fabricated of plastic material. In alternate embodiments container 152 is provided in various sizes, fabricated of non-plastic material and may be offered in a variety of colors.

Plurality of generally-round-ventilation-holes 174 on container 152 side-wall 170 is useful for ventilating container 152 when in use. Pair of handles 176 are formed in side-wall 170 of container 152 adjacent a top of side-wall 170 and are useful for lifting and placing container 152 onto and off of base 122. Lid 162 is removably attachable to container 152 via lid-attacher 164 comprising a wire loop such that cylindrical shape inner volume 166 is able to be substantially enclosed when lid 162 is attached and alternately accessed when lid 162 is removed. Lid 162 snaps onto top of side-wall 170 and is held in place via tension.

Figure 4:
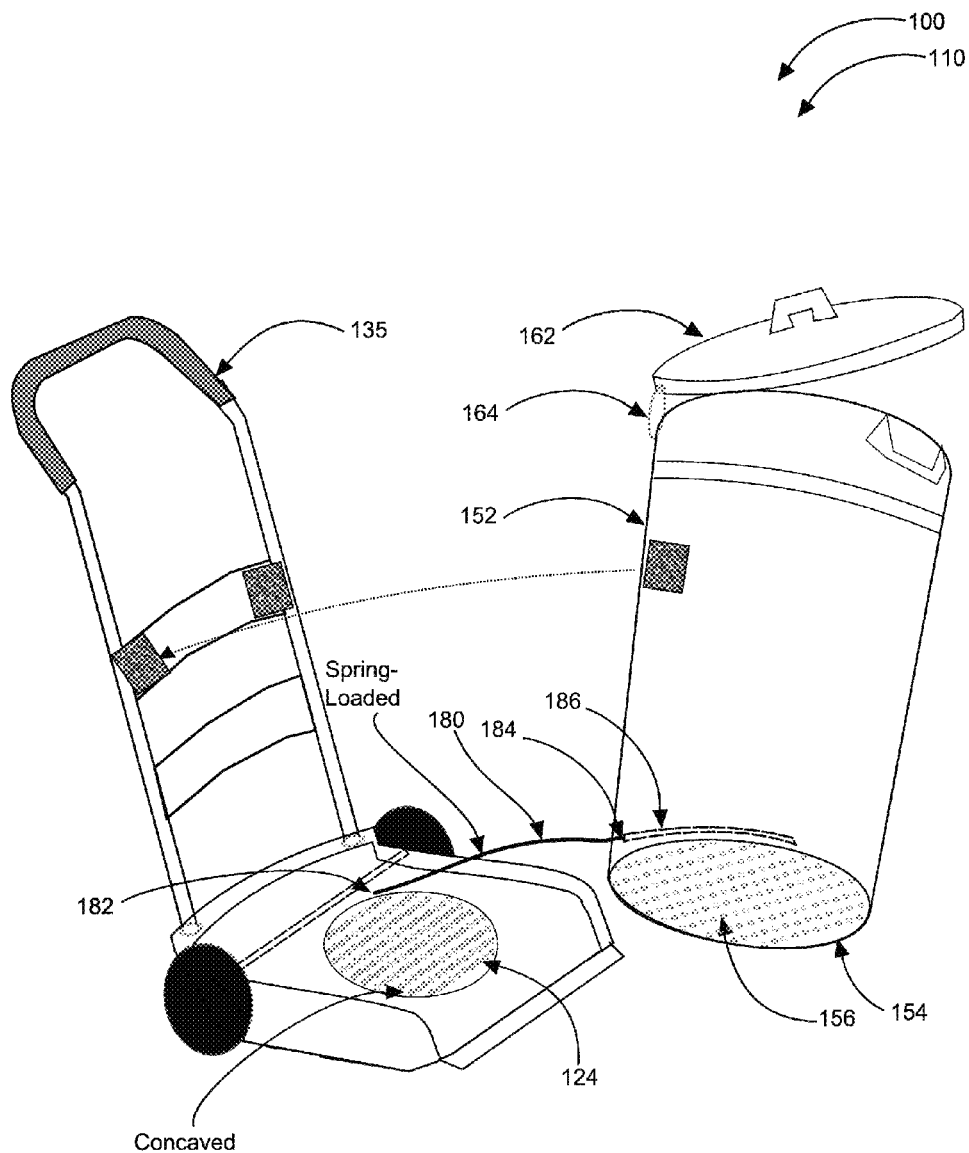
FIG. 4 is a perspective view illustrating the container as joined (tethered) to the wheeled-carrier according to an embodiment of the present invention of FIG. 1.

Referring now to FIG. 4, a perspective view illustrating container 152 being joined (tethered) to wheeled-carrier 120 according to an embodiment of the present invention of FIG. 1.

Retractable-cord 180 having cord-first-end 182 and cord-second-end 184 comprises a tether able to be retracted via a spring-loaded mechanism into retractable-cord-holder 186 of container-bottom 154. Cord-first-end 182 of retractable-cord 180 is attached to base 122 of wheeled-carrier 120, and cord-second-end 184 of retractable-cord 180 is attached to side-wall 170 of container 152 adjacent a bottom of side-wall 170 such that wheeled-carrier 120 and container 152 remain coupled if trash-can-assembly 110 is knocked over.

Clean street can system 100 may be sold as kit 440 comprising the following parts: at least one wheeled-carrier 120; at least one container 154; at least one first-attacher 124; at least one second-attacher 156; at least one a lid 162; at least one lid-attacher 164; at least one retractable-cord 180; and at least one set of user instructions. Clean street can system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different tether means and various color combinations for use in visually discriminating between types of refuse (recycled or other), parts may be sold separately, etc., may be sufficient.

Figure 5:
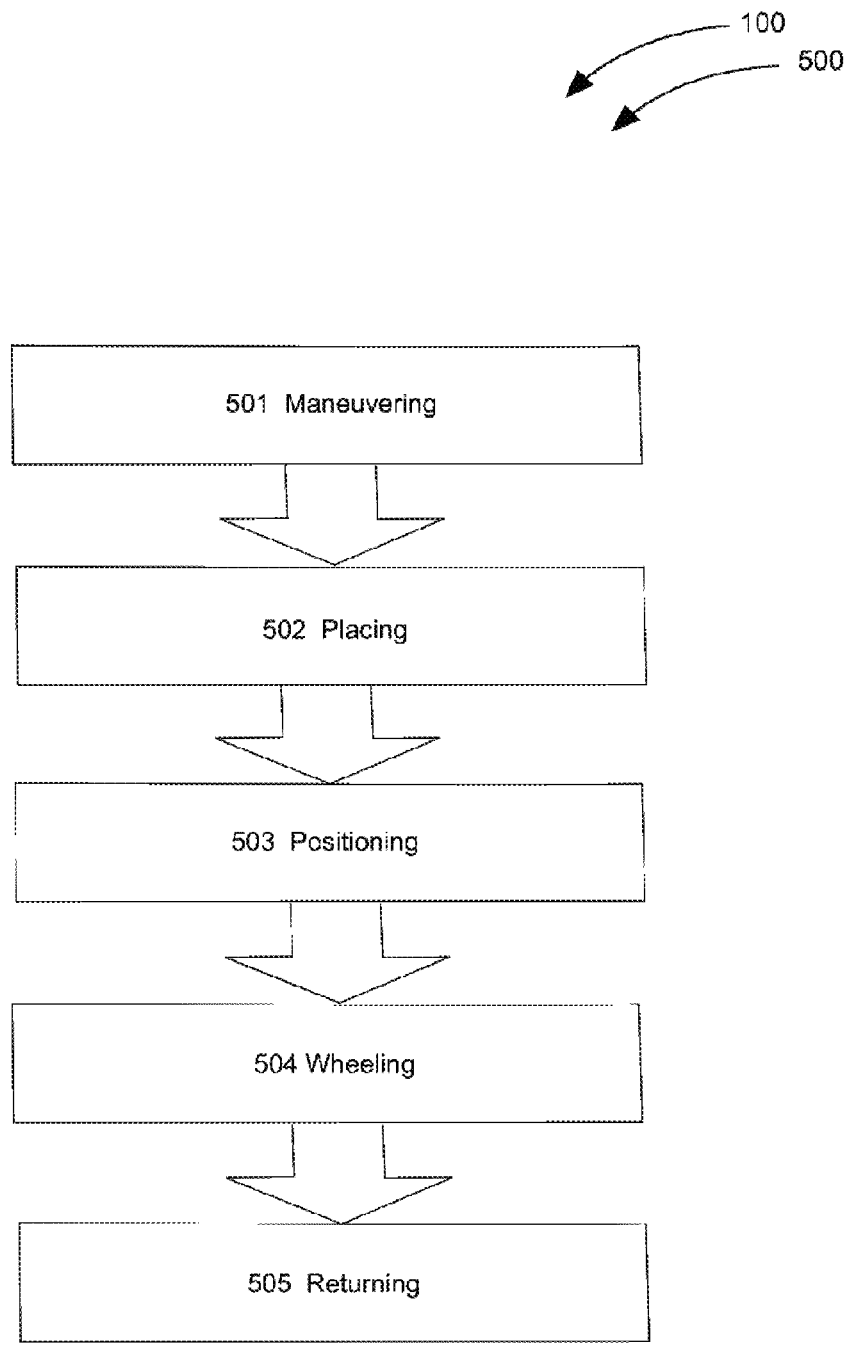
FIG. 5 is a flowchart illustrating a method of use for the clean street can system according to an embodiment of the present invention of FIGS. 1-4.

Referring now to FIG. 5, a flowchart illustrating a method of use 500 for clean street can system 100 according to an embodiment of the present invention of FIGS. 1-4.

Method of use 500 for clean street can system 100 preferably comprises the steps of: step one 501 maneuvering container 152 onto base of wheeled-carrier 120; step two 502 placing trash into container 152; step three 503 positioning lid 162 onto container 152; step four 504 wheeling trash-can-assembly 110 to pick up location; and step five 505 returning trash-can-assembly 110 to its home location.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A clean street trash can system comprising:
   a trash-can-assembly including;
      a wheeled-carrier comprising;
         a base having a first-attacher;
         at least one pair of wheels; and
         a u-shape-handle;
      a container having;
         a container-bottom having a second-attacher;
         a side-wall having a top-receiving-opening;
         a lid having a lid-attacher;
         a cylindrical shape inner volume for holding at least one disposable item defined by said container-bottom, said side-wall and said lid;
         a plurality of generally-round-ventilation-holes;
         a pair of handles; and
      a retractable-cord having;
         a cord-first-end; and
         a cord-second-end;
   wherein said clean street trash can system comprises said trash-can-assembly;
   wherein said trash-can-assembly comprises in combination said wheeled-carrier, said container, and said retractable-cord;
   wherein said wheeled-carrier comprises in combination said base having a first-attacher, said at least one pair of wheels, and said u-shape-handle;
   wherein said container comprises in combination said container-bottom having said second-attacher, said side-wall, said cylindrical shape inner volume, said plurality of generally-round-ventilation-holes located in said side-wall, said pair of handles, and said lid having said lid-attacher;
   wherein said wheeled-carrier is of sufficient strength to hold said container when filled with said at least one disposable item;
   wherein said container is attachable to said base using said first-attacher and said container extends upwardly from said base having said first-attacher at a generally perpendicular angle to said top-receiving-opening of said container;
   wherein said base having said first-attacher is sized to match a size of said container-bottom having said second-attacher to promote stability in use;
   wherein said at least one pair of wheels are removably attached to said base such that said trash-can-assembly is portable and readily mobile;
   wherein said cylindrical shape inner volume extends upwardly from said base as defined by said side-wall;
   wherein said plurality of generally-round-ventilation-holes are useful for ventilating said container when in use;
   wherein said pair of handles are formed in said side-wall of said container adjacent a top of said side-wall and are useful for lifting and placing said container onto and off of said base;
   wherein said lid is removably attachable to said container such that said inner volume is able to be substantially enclosed when said lid is attached and alternately accessed when said lid is removed;
   wherein said cord-first-end of said retractable-cord is attached to said base, and said cord-second-end of said retractable-cord is attached to said container such that said wheeled-carrier and said container remain coupled if said trash-can-assembly is knocked over;
   wherein said first-attacher and said second-attacher comprise hook-and-loop such that when said container is placed onto said base said container is removably attached to said base via said hook-and-loop;
   wherein a user is able to attach said container to said base via said retractable-cord; and
   wherein said user is able to place said at least one disposable item into said cylindrical shape inner volume and transport said trash-can-assembly between locations for collection and disposal of said at least one disposable item using said wheeled-carrier.

2. The clean street can system of claim 1 wherein said base comprises a ramp.

3. The clean street can system of claim 2 wherein said ramp comprises an inclined surface.

4. The clean street can system of claim 3 wherein said base comprises a concave-platform for holding said container-bottom.

5. The clean street can system of claim 4 wherein said base comprises a short-retaining-wall measuring about four to eight inches in height having a left-wall, a back-wall and a rightwall for retaining said container-bottom.

6. The clean street can system of claim 5 wherein said at least one pair of wheels are held in place by an axle running through said back-wall.

7. The clean street can system of claim 6 wherein said at least one pair of wheels comprise molded rubber with tread useful in indoor and outdoor environments and for negotiating a variety of terrains.

8. The clean street can system of claim 6 wherein said at least one pair of wheels comprise molded plastic with tread.

9. The clean street can system of claim 1 wherein said u-shape-handle comprises a handlefirst-end, a handle-second-end, a handle-cross-section and a handle-height.

10. The clean street can system of claim 9 wherein said handle-first-end and handle-second-end are removably inserted into said back-wall via a left-back-wall-opening and a rightback-wall-opening.

11. The clean street can system of claim 9 wherein said handle-cross-section comprises a rubber-cover.

12. The clean street can system of claim 11 wherein said u-shape-handle comprises at least one generally horizontal retaining-section attached to said u-shape-handle.

13. The clean street can system of claim 12 wherein said at least one generally horizontal retaining-section comprises a curvature for retaining said side-wall having a circular said top-receiving-opening of said container.

14. The clean street can system of claim 1 wherein said retractable-cord comprises a tether able to be retracted into a retractable-cord-holder of said container-bottom.

15. The clean street can system of claim 14 wherein said cord-first-end of said retractable-cord is attached to said base.

16. The clean street can system of claim 14 wherein said cord-second-end of said retractable-cord is attached to said container-bottom.

17. The clean street can system of claim 1 wherein said first-attacher of said base comprises a magnet.

18. The clean street can system of claim 1 wherein said second-attacher of said container-bottom comprises a magnet.

19. A clean street can system comprising:
    a trash-can-assembly including;
       a wheeled-carrier comprising;
          a base having a first-attacher;
          at least one pair of wheels; and a u-shape-handle;
a container having;
   a container-bottom having a second-attacher;
   a side-wall having a top-receiving-opening;
   a lid having a lid-attacher;
   a cylindrical shape inner volume for holding at least one disposable item defined by said container-bottom, said side-wall and said lid;
   a plurality of generally-round-ventilation-holes;
   a pair of handles; and
a retractable-cord having;
   a cord-first-end; and
   a cord-second-end;
wherein said clean street trash can system comprises said trash-can-assembly;
wherein said trash-can-assembly comprises in combination said wheeled-carrier, said container, and said retractable-cord;
wherein said wheeled-carrier comprises in combination said base having a first-attacher, said at least one pair of wheels, and said u-shape-handle;
wherein said container comprises in combination said container-bottom having said second-attacher, said side-wall, said cylindrical shape inner volume, said plurality of generally-round-ventilation-holes located in said side-wall, said pair of handles, and said lid having said lid-attacher;
wherein said wheeled-carrier is of sufficient strength to hold said container when filled with said at least one disposable item;
wherein said base comprises a concave-platform for holding said container-bottom;
wherein said base having said first-attacher is sized to match a size of said container-bottom having said second-attacher to promote stability in use;
wherein said base comprises a ramp;
wherein said ramp comprises an inclined surface;
wherein said base comprises a short-retaining-wall measuring about four to eight inches in height having a left-wall, a back-wall and a right-wall for retaining said container-bottom;
wherein said at least one pair of wheels are removably attached to said base such that said trash-can-assembly is readily mobile;
wherein said at least one pair of wheels are held in place by an axle running through said back-wall;
wherein said at least one pair of wheels comprise molded rubber with tread useful in indoor and outdoor environments and for negotiating a variety of terrains;
wherein said u-shape-handle comprises a handle-first-end, a handle-second-end, a handle-cross-section and a handle-height;
wherein said handle-first-end and handle-second-end are removably inserted into said back-wall via a left-back-wall-opening and a right-back-wall-opening;
wherein said handle-cross-section comprises a rubber-cover;
wherein said u-shape-handle comprises at least one generally horizontal retaining-section attached to said u-shape-handle;
wherein said at least one generally horizontal retaining-section comprises a curvature for retaining said side-wall having a circular said top-receiving-opening of said container;
wherein said container is attachable to said base using said first-attacher and said container extends upwardly from said base having said first-attacher at a generally perpendicular angle to said top-receiving-opening of said container;
wherein said cylindrical shape inner volume extends upwardly from said base as defined by said side-wall;
wherein said plurality of generally-round-ventilation-holes are useful for ventilating said container when in use;
wherein said pair of handles are formed in said side-wall of said container adjacent a top of said side-wall and are useful for lifting and placing said container onto and off of said base;
wherein said lid is removably attachable to said container such that said inner volume is able to be substantially enclosed when said lid is attached and alternately accessed when said lid is removed;
wherein said retractable-cord comprises a tether able to be retracted into a retractable-cord-holder of said container-bottom;
wherein said cord-first-end of said retractable-cord is attached to said base, and said cord-second-end of said retractable-cord is attached to said container such that said wheeled-carrier and said container remain coupled if said trash-can-assembly is knocked over;
wherein said cord-first-end of said retractable-cord is attached to said base;
wherein said cord-second-end of said retractable-cord is attached to said container-bottom as a tether;
wherein said first-attacher and said second-attacher comprise hook-and-loop such that when said container is placed onto said base said container is removably attached to said base via said hook-and-loop;
wherein a user is able to attach said container to said base via said retractable-cord; and
wherein said user is able to place said at least one disposable item into said cylindrical shape inner volume and transport said trash-can-assembly between locations for collection and disposal of said at least one disposable item using said wheeled-carrier.

* * * * *